(12) United States Patent
Bilik et al.

(10) Patent No.: US 10,585,182 B2
(45) Date of Patent: Mar. 10, 2020

(54) VELOCITY MEASUREMENT WITH ASYMMETRIC DOPPLER SPECTRUM

(71) Applicant: GM Global Technology Operations LLC, Detroit, MI (US)

(72) Inventors: Igal Bilik, Rehovot (IL); Alexander Pokrass, Bat Yam (IL); Shahar Villeval, Tel Aviv (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 365 days.

(21) Appl. No.: 15/468,192

(22) Filed: Mar. 24, 2017

(65) Prior Publication Data

US 2018/0275264 A1 Sep. 27, 2018

(51) Int. Cl.
| | |
|---|---|
| *G01S 13/58* | (2006.01) |
| *G01S 13/93* | (2006.01) |
| *G01S 13/931* | (2020.01) |
| *G01S 13/00* | (2006.01) |

(52) U.S. Cl.
CPC .......... *G01S 13/581* (2013.01); *G01S 13/931* (2013.01); *G01S 2013/9342* (2013.01); *G01S 2013/9346* (2013.01)

(58) Field of Classification Search
None
See application file for complete search history.

(56) References Cited

U.S. PATENT DOCUMENTS

| | | | | |
|---|---|---|---|---|
| 2,996,708 | A * | 8/1961 | Tollefson | G01S 7/038 342/114 |
| 3,195,129 | A * | 7/1965 | Fishbeln | G01S 13/342 342/104 |
| 3,254,338 | A * | 5/1966 | Healey, III | G01S 7/038 342/104 |
| 4,118,701 | A * | 10/1978 | Fletcher | G01S 13/584 342/109 |
| 4,301,453 | A * | 11/1981 | Neininger | G01S 13/343 342/109 |
| 4,308,536 | A * | 12/1981 | Sims, Jr. et al. | G01S 13/931 343/7 VM |
| 4,338,603 | A * | 7/1982 | Magorian | G01S 13/58 342/160 |
| 4,388,622 | A * | 6/1983 | Fletcher, Jr. | G01S 13/343 342/112 |
| 4,403,220 | A * | 9/1983 | Donovan | G01S 13/9303 342/29 |
| 4,891,649 | A * | 1/1990 | Labaar | G01S 7/2921 342/175 |
| 6,097,331 | A * | 8/2000 | Matsugatani | G01S 13/931 342/109 |
| 2002/0180632 | A1* | 12/2002 | Isaji | G01S 13/34 342/70 |

(Continued)

*Primary Examiner* — Bernarr E Gregory
(74) *Attorney, Agent, or Firm* — Cantor Colburn LLP

(57) ABSTRACT

A method and system to obtain a velocity measurement of a target detected by a radar system using an asymmetric Doppler spectrum includes a receive portion of the radar system to receive a reflected signal from the target. A mixer mixes the reflected signal with a shifted signal to obtain a mixed signal. The shifted signal is a shifted version of a transmitted signal that results in the reflected signal and the Doppler spectrum is defined by a frequency shift value of the shifted signal. A processor processes the mixed signal to obtain the velocity measurement.

16 Claims, 3 Drawing Sheets

(56) References Cited

U.S. PATENT DOCUMENTS

2008/0080599 A1* 4/2008 Kang .................. G01S 13/34
  375/219
2016/0124085 A1* 5/2016 Mende et al. ........ G01S 13/584

* cited by examiner

VELOCITY MEASUREMENT WITH ASYMMETRIC DOPPLER SPECTRUM

INTRODUCTION

The subject disclosure relates to velocity measurement with an asymmetric Doppler spectrum.

Radar systems are used to detect and track targets for a wide range of applications. When the target moves relative to the platform on which the radar system is operated, the frequency of the received reflection increases or decreases based on whether the target is moving toward or away from the platform. This is referred to as the Doppler effect and facilitates the determination of the velocity of the target. The range of target velocities that can be detected is currently symmetric. Thus, the radar system can detect the same maximum velocity of a target moving away from the platform and toward the platform. Accordingly, it is desirable to provide an asymmetric Doppler spectrum.

SUMMARY

In one exemplary embodiment, a system to obtain a velocity measurement of a target detected by a radar system using an asymmetric Doppler spectrum includes a receive portion of the radar system to receive a reflected signal from the target. A mixer mixes the reflected signal with a shifted signal to obtain a mixed signal. The shifted signal is a shifted version of a transmitted signal that results in the reflected signal and the Doppler spectrum is defined by a frequency shift value of the shifted signal. A processor processes the mixed signal to obtain the velocity measurement.

In addition to one or more of the features described herein, the transmitted signal is at a carrier frequency $f_c$ and the shifted signal is at a frequency of $f_c+f_A$ and $f_A$ is the frequency shift value.

In addition to one or more of the features described herein, the Doppler spectrum is from $-f_D+f_A$ to $f_D+f_A$ and $f_D$ is a pulse repetition frequency of the transmitted signal.

In addition to one or more of the features described herein, the processor determines different maximum detectable values of the velocity measurement for the target based on whether the target is approaching or receding from the radar system in accordance with the Doppler spectrum.

In addition to one or more of the features described herein, the different maximum detectable values of the velocity measurement are based on the frequency shift value.

In addition to one or more of the features described herein, the system is housed in a vehicle.

In another exemplary embodiment, a method to obtain a velocity measurement of a target detected by a radar system using an asymmetric Doppler spectrum includes receiving, using a receive portion of the radar system, a reflected signal from the target, and generating a shifted signal as a shifted version of a transmitted signal that results in the reflected signal. The Doppler spectrum is defined based on a frequency shift value of the shifted signal, and the reflected signal is mixed with the shifted signal to obtain a mixed signal. The mixed signal is processed to obtain the velocity measurement, wherein a maximum detectable velocity is in accordance with the Doppler spectrum.

In addition to one or more of the features described herein, the transmitted signal is transmitted at a carrier frequency $f_c$, wherein the generating the shifted signal is at a frequency of $f_c+f_A$ and $f_A$ is the frequency shift value.

In addition to one or more of the features described herein, defining the Doppler spectrum is from $-f_D+f_A$ to $f_D+f_A$ and $f_D$ is a pulse repetition frequency of the transmitted signal.

In addition to one or more of the features described herein, the maximum detectable velocity is determined as different maximum detectable values of the velocity measurement for the target based on whether the target is approaching or receding from the radar system in accordance with the Doppler spectrum.

In addition to one or more of the features described herein, determining the different maximum detectable values of the velocity measurement is based on the frequency shift value.

In another exemplary embodiment, an automobile includes a receive portion of a radar system to receive a reflected signal from a target. A mixer mixes the reflected signal with a shifted signal to obtain a mixed signal. The shifted signal is a shifted version of a transmitted signal that results in the reflected signal and a Doppler spectrum is defined by a frequency shift value of the shifted signal. A a processor processes the mixed signal to obtain the velocity measurement. The processor provides the velocity measurement to another system of the automobile. The another system including a braking system or autonomous driving system.

In addition to one or more of the features described herein, the transmitted signal is at a carrier frequency $f_c$ and the shifted signal is at a frequency of $f_c+f_A$ and $f_A$ is the frequency shift value.

In addition to one or more of the features described herein, the Doppler spectrum is from $-f_D+f_A$ to $f_D+f_A$ and $f_D$ is a pulse repetition frequency of the transmitted signal.

In addition to one or more of the features described herein, the processor determines different maximum detectable values of the velocity measurement for the target based on whether the target is approaching or receding from the radar system in accordance with the Doppler spectrum.

In addition to one or more of the features described herein, the different maximum detectable values of the velocity measurement are based on the frequency shift value.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
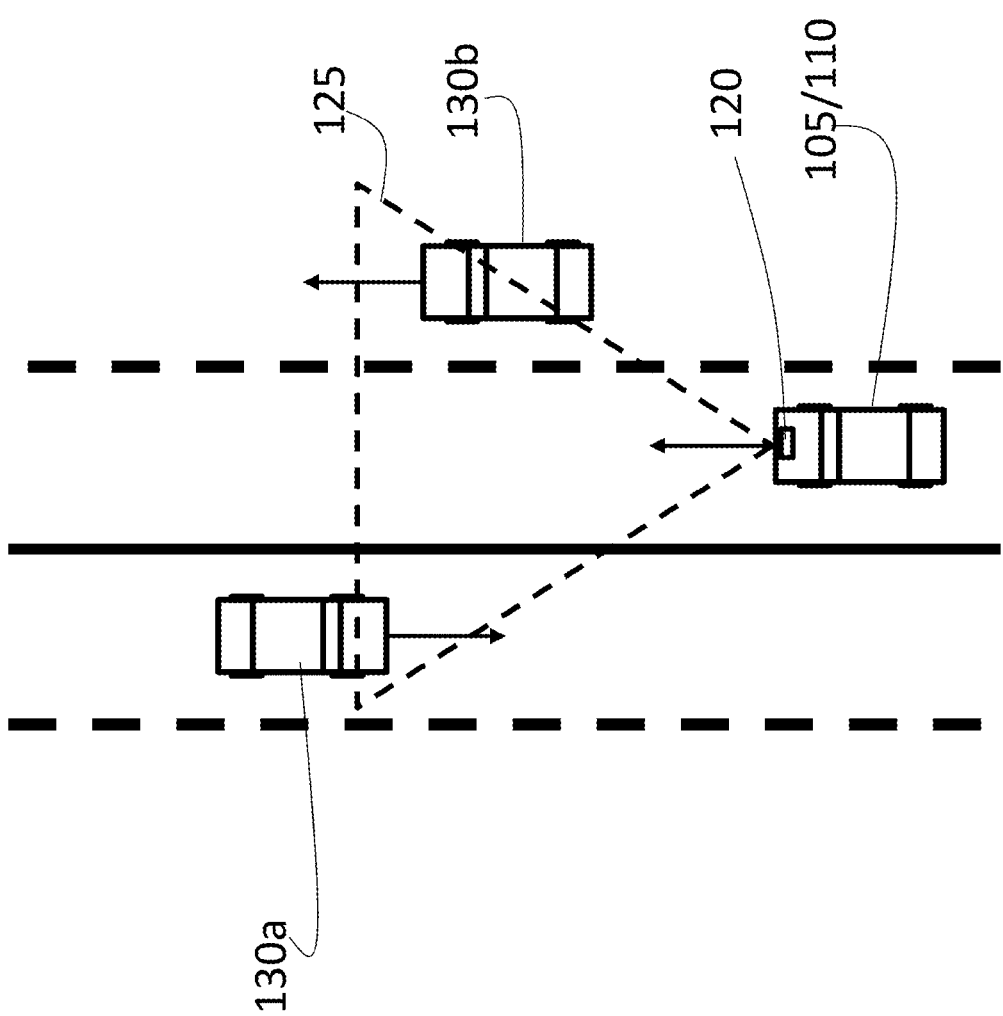
FIG. 1 illustrates a radar system performing a velocity measurement with an asymmetric Doppler spectrum according to one or more embodiments.

The following description is merely exemplary in nature and is not intended to limit the present disclosure, its application or uses. It should be understood that throughout the drawings, corresponding reference numerals indicate like or corresponding parts and features.

As previously noted, a radar system can use the Doppler effect to determine the velocity of a target that is moving relative to the platform on which the radar system is mounted. Currently, a symmetric range of velocities is detected based on the Doppler effect. That is, the same maximum velocity can be detected for a target travelling away from the platform as for one that is travelling toward the platform. The maximum velocity is given by:

$$|v_{max}| = \frac{f_{s(Doppler)}}{4f_c} \cdot c \quad [\text{EQ. 1}]$$

In EQ. 1, $f_{s(Doppler)}$ is the pulse repetition frequency (PRF), $f_c$ is the carrier frequency of the radar system, and c is the speed of light. The transmitted signal is at the carrier frequency $f_c$. When there is no relative movement between the target and the radar system, reflections from the target are received at the PRF, when the target is moving away from the radar system, reflections are received at frequencies that are increasingly lower than the PRF, and when the target is moving toward the radar system, reflections are received at frequencies that are increasingly higher than the PRF. As EQ. 1 indicates, the absolute value of the maximum velocity, $v_{max}$, is determined such that a symmetric range of velocities ($-v_{max}$ to $v_{max}$) can be found when working in the frequency domain after performing a fast Fourier transform (FFT). For example, with a PRF ($f_{s(Doppler)}$) of 29 kilohertz (kHz) and a carrier frequency of 77 gigahertz (GHz), $v_{max}$ can be detected within the range of approximately −100 kilometers per hour (kph) to 100 kph according to EQ. 1.

Based on the application, however, a higher maximum velocity in one direction versus the other may be desirable. For example, the radar system can be mounted on a platform that is a vehicle (e.g., automobile, farm equipment, construction equipment) or automated factory equipment, for example. For such platforms, a higher maximum resolvable velocity is desirable for a target moving toward the platform, even at the expense of a reduced maximum resolvable velocity for a target moving away from the platform. Detecting a higher maximum velocity of a target approaching the platform can facilitate collision avoidance, automated operation, and other operations in an automobile, for example. Embodiments of the methods and systems detailed herein relate to performing velocity measurement with an asymmetric Doppler spectrum. Accordingly, an asymmetric range of velocities ($-v_{max(receding)}$ to $v_{max(approaching)}$) can be found for receding and approaching targets.

FIG. 1 shows a scenario in which a radar system 120 performs a velocity measurement with an asymmetric Doppler spectrum according to one or more embodiments. A platform 110 is shown for the radar system 120. In the exemplary case, the platform 110 is an automobile 105. Two targets 130a, 130b are within the field of view 125 of the radar system 120. The target 130a is moving toward the automobile 105, and the target 130b is moving away from the automobile 105. As FIG. 1 makes clear, a vehicle (target 130b) that is rapidly moving away from the automobile 105 is not of as much interest as a vehicle (target 130a) that is moving toward the automobile 105. This is because the target 130a could change course and collide with the automobile or otherwise create an obstacle for the automobile 105. Thus, this scenario is one in which the approaching vehicle (target 130a) is of more interest than the receding vehicle (target 130b). That is, a higher $v_{max(approaching)}$ than $-v_{max(receding)}$ is of interest. If the automobile 105 is a police car chasing the receding vehicle (target 130b), for example, then the priority may change, and a higher $-v_{max(receding)}$ may be of interest.

Figure 2:
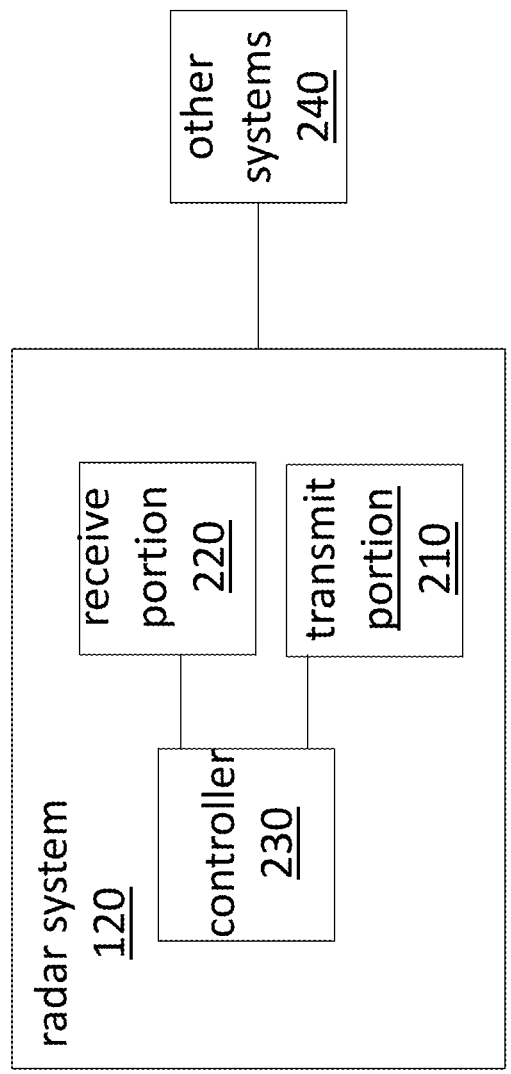
FIG. 2 is a block diagram of the radar system according to one or more embodiments.

FIG. 2 is a block diagram of the radar system 120 according to one or more embodiments. The radar system 120 includes a transmit portion 210 and a receive portion 220. According to an exemplary embodiment, the radar system 120 may be a multi-input multi-output (MIMO) radar such that the transmit portion 210 and receive portion 220 each include multiple antenna elements. Other exemplary radar systems include single-input multiple-output (SIMO) with a single transmit element in the transmit portion 210 and multiple receive elements in the receive portion 220, multiple-input single-output (MISO) with multiple transmit elements in the transmit portion 210 and a single receive element in the receive portion 220, and single-input single-output (SISO) with a single transmit element in the transmit portion 210 and a single receive element in the receive portion 220. Processing of the transmitted and received signals may be performed by separate processors that are part of the transmit portion 210 and receive portion 220. According to the exemplary embodiment shown in FIG. 2, a controller 230 processes the transmitted and received signals. The controller 230 can also communicate information to and from other systems 240 of the platform 110. For example, when the platform 110 is an automobile 105, the controller 230 may communicate with another system within the automobile 105 such as a collision avoidance system, an autonomous driving system, or a braking system. The other systems can use the information to make decisions that involve braking or automated steering control, for example.

The controller 230 includes processing circuitry and an interface to send and receive data. The processing circuitry may include an application specific integrated circuit (ASIC), an electronic circuit, a processor (shared, dedicated, or group) and memory that executes one or more software or firmware programs, a combinational logic circuit, and/or other suitable components that provide the described functionality. When processing a received signal, the controller 230 can shift the Doppler spectrum, as further detailed with reference to FIG. 3.

Figure 3:
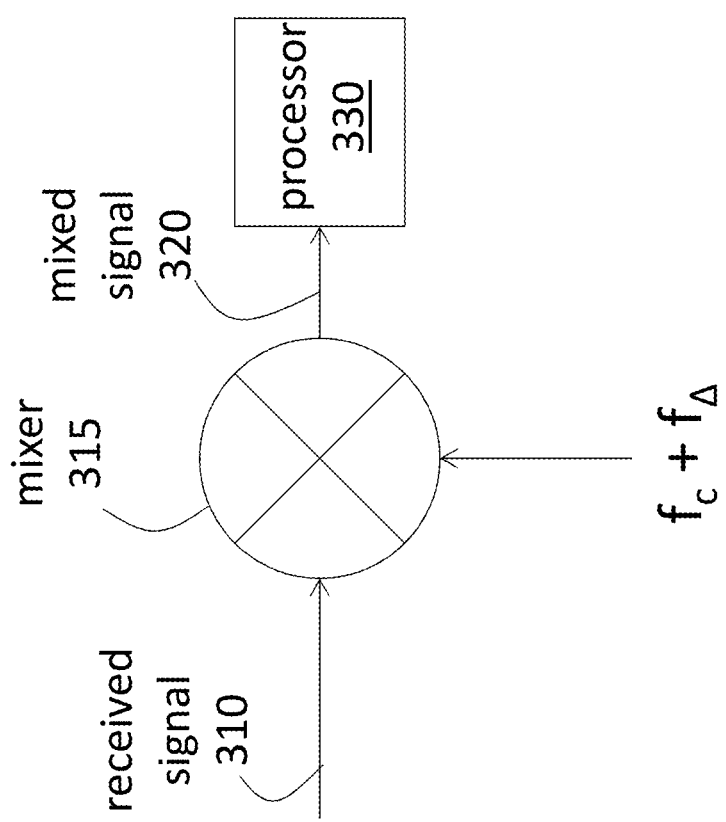
FIG. 3 is a block diagram illustrating the signal processing of a received signal according to one or more embodiments.

FIG. 3 is a block diagram illustrating the signal processing of a received signal 310 according to one or more embodiments. The received signal 310, received by an antenna element in the receive portion 220, is processed, as shown in FIG. 3, prior to sampling. As previously noted, the processing of the received signal 310 may be done by one or more processors specific to the receive portion 220 of the radar system 120 or by the controller 230. The received signal 310 is mixed, using mixer 315, with a shifted version of the carrier signal ($f_c+f_\Delta$) in order to shift the Doppler spectrum. The resulting mixed signal 320 is provided to a processor 330 that includes, for example, an analog-to-digital converter (ADC) and additional components to process the mixed signal 320 according to known processing steps in order to detect and track targets. The shift in the Doppler spectrum is from $[-fs_{(Doppler)}:fs_{(Doppler)}]$ to $[-fs_{(Doppler)}+f_\Delta: fs_{(Doppler)}+f_\Delta]$. Thus, the absolute value of the maximum detectable velocity of an approaching target, $v_{max(approaching)}$, which is $fs_{(Doppler)}+f_\Delta$, is a different absolute value than the maximum detectable velocity of a receding target, $v_{max(receding)}$, which is $-fs_{(Doppler)}+f_\Delta$.

For example, if the initial Doppler spectrum were [−8e3: 8e3], a shift $f_\Delta$ of 6.5 kilohertz would shift the Doppler spectrum to [−8e3+6.5e3:8e3+6.5e3] or [−1.5e3:14.5e3] hertz. Then, according to EQ. 1 using a sampling frequency of 16 KHz, with $f_{s(Doppler)}=-1.5$ e3, $-v_{max(receding)}$ is $-10$ kph, and with $f_{s(Doppler)}=14.5$e3, $v_{max(approaching)}$ is 100 kph.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the description not be limited to the particular embodiments disclosed, but will include all embodiments falling within the scope of the application.

What is claimed is:

1. A system to obtain a velocity measurement of a target detected by a radar system using an asymmetric Doppler spectrum, the system comprising:
   a receive portion of the radar system configured to receive a reflected signal from the target;
   a mixer configured to mix the reflected signal with a shifted signal to obtain a mixed signal, wherein the shifted signal is a shifted version of a transmitted signal that results in the reflected signal and the Doppler spectrum that determines a range of detectable values of the velocity measurement is defined by and is asymmetrical around zero based on a frequency shift value of the shifted signal that is mixed with the reflected signal by the mixer; and
   a processor configured to process the mixed signal to obtain the velocity measurement.

2. The system according to claim 1, wherein the transmitted signal is at a carrier frequency $f_c$ and the shifted signal is at a frequency of $f_c+f_\Delta$ and $f_\Delta$ is the frequency shift value.

3. The system according to claim 2, wherein the Doppler spectrum is from $-f_D+f_\Delta$ to $f_D+f_\Delta$ and $f_D$ is a pulse repetition frequency of the transmitted signal.

4. The system according to claim 1, wherein the processor controls the Doppler spectrum to set different maximum detectable values of the velocity measurement for the target based on whether the target is approaching or receding from the radar system in accordance with the Doppler spectrum.

5. The system according to claim 4, wherein the different maximum detectable values of the velocity measurement are set based on the frequency shift value.

6. The system according to claim 1, wherein the system is housed in a vehicle.

7. A method to obtain a velocity measurement of a target detected by a radar system using an asymmetric Doppler spectrum, the method comprising:
   receiving, using a receive portion of the radar system, a reflected signal from the target;
   generating a shifted signal as a shifted version of a transmitted signal that results in the reflected signal;
   defining the Doppler spectrum, which determines a range of detectable values of the velocity measurement and is asymmetrical around zero, based on a frequency shift value of the shifted signal;
   mixing, using a mixer, the reflected signal with the shifted signal to obtain a mixed signal; and
   processing the mixed signal to obtain the velocity measurement, wherein a maximum detectable velocity is in accordance with the Doppler spectrum.

8. The method according to claim 7, further comprising transmitting the transmitted signal at a carrier frequency $f_c$, wherein the generating the shifted signal is at a frequency of $f_c+f_\Delta$ and $f_\Delta$ is the frequency shift value.

9. The method according to claim 8, wherein the defining the Doppler spectrum is from $-f_D+f_\Delta$ to $f_D+f_\Delta$ and $f_D$ is a pulse repetition frequency of the transmitted signal.

10. The method according to claim 7, further comprising controlling the Doppler Spectrum to set the maximum detectable velocity as different maximum detectable values of the velocity measurement for the target based on whether the target is approaching or receding from the radar system in accordance with the Doppler spectrum.

11. The method according to claim 10, wherein the determining the different maximum detectable values of the velocity measurement for approaching versus receding targets is based on the frequency shift value.

12. An automobile, comprising:
   a receive portion of a radar system configured to receive a reflected signal from a target;
   a mixer configured to mix the reflected signal with a shifted signal to obtain a mixed signal, wherein the shifted signal is a shifted version of a transmitted signal that results in the reflected signal and the Doppler spectrum that determines a range of detectable values of the velocity measurement is defined by and is asymmetrical around zero based on a frequency shift value of the shifted signal that is mixed with the reflected signal by the mixer; and
   a processor configured to process the mixed signal to obtain the velocity measurement, wherein the processor provides the velocity measurement to another system of the automobile, the another system including a braking system or autonomous driving system.

13. The automobile according to claim 12, wherein the transmitted signal is at a carrier frequency $f_c$ and the shifted signal is at a frequency of $f_c+f_\Delta$ and $f_\Delta$ is the frequency shift value.

14. The automobile according to claim 13, wherein the Doppler spectrum is from $-f_D+f_\Delta$ to $f_D+f_\Delta$ and $f_D$ is a pulse repetition frequency of the transmitted signal.

15. The automobile according to claim 12, wherein the processor controls the Doppler spectrum to set different maximum detectable values of the velocity measurement for the target based on whether the target is approaching or receding from the radar system in accordance with the Doppler spectrum.

16. The automobile according to claim 15, wherein the different maximum detectable values of the velocity measurement are set based on the frequency shift value.

* * * * *